United States Patent [19]

Schulz

[11] Patent Number: 5,091,032

[45] Date of Patent: Feb. 25, 1992

[54] MULTI-NIP HIGH-SPEED PAPER CONVERTING

[75] Inventor: Galyn A. Schulz, Appleton, Wis.

[73] Assignee: James River Corporation of Virginia, Richmond, Va.

[21] Appl. No.: 377,586

[22] Filed: Jul. 10, 1989

[51] Int. Cl.⁵ .............................................. B31F 1/00
[52] U.S. Cl. .................................... 156/219; 156/209; 156/220; 156/291; 156/553; 264/284
[58] Field of Search ............... 156/181, 209, 210, 219, 156/220, 291, 470, 553, 555; 264/284, 293

[56] References Cited

U.S. PATENT DOCUMENTS

| | | | |
|---|---|---|---|
| 3,673,052 | 6/1972 | Small et al. | 156/209 X |
| 3,775,231 | 11/1973 | Thomas | 156/179 X |
| 4,325,768 | 4/1982 | Schulz | 156/209 X |
| 4,610,743 | 9/1986 | Salmeen et al. | 156/291 X |

Primary Examiner—David A. Simmons
Assistant Examiner—James J. Engel, Jr.
Attorney, Agent, or Firm—Cooper & Dunham

[57] ABSTRACT

A converted product which is particularly high both in bulk and in perceived softness is produced by pre-embossing the plies individually, joining the plies and calendering and again embossing. In another example, the pre-emboss step is omitted.

7 Claims, 1 Drawing Sheet

MULTI-NIP HIGH-SPEED PAPER CONVERTING

FIELD OF THE INVENTION

The invention is in the field of converting paper products and pertains specifically to producing converted products in the form of a tissue or a towel product or the like.

BACKGROUND OF THE INVENTION

In manufacturing a converted product in the form of a tissue or a towel product or the like, some of the desirable characteristics of the converted product are bulk, which is believed to be desirable for visual aesthetics and marketability considerations, and softness (or at least the consumer's perception of softness), which is believed to be important for market acceptance. Another desirable characteristic is that the product should retain sufficient strength to allow high-speed converting. However, these desirable characteristics have conflicting requirements. For example, when embossing is used to make the product bulkier, the protuberances which it forms in the product tend to reduce the consumer's perception of softness. Greater softness in this context usually means less product strength, which tends to impede running the converting process at a speed commensurate with that of a typical papermaking machine. A converted product which is not very bulky may be perceived as sufficiently soft, but lower bulk product tends to be less desirable from aesthetic and marketing points of view, for example because the roll of tissue or towelling may seem smaller. While much effort has been devoted to finding acceptable compromises between these conflicting requirements, it is believed that a need still remains for achieving the desirable end results while reducing or eliminating the undesirable consequences, and this invention is directed to meeting this need.

It has been proposed in prior patents (such as U.S. Pat. Nos. 3,414,459, 3,547,723, 3,556,907, 3,775,231, 4,284,465, 4,307,141 and 4,325,768) to use various combinations and subcombinations of embossing and calendering, such as individually embossing a pair of plies and then joining them and calendering the resulting multi-ply web, or individually calendering and embossing plies and then joining them, or individually pre-embossing a pair of plies and then joining them and embossing the resulting web, or using a succession of out-of-register embossing steps, or pre-embossing and then joining, etc. However, it is believed that the particular sequence of the steps of pre-embossing, calendering, and then again embossing, and the particular way of carrying out these steps as taught in this specification produce substantially superior results but are not known in the prior art.

SUMMARY OF THE INVENTION

The invention provides a converted product which is particularly high both in bulk and in perceived softness, and into which paper can be converted at a particularly high speed. In one nonlimiting embodiment, a multi-ply web of a material such as paper is made bulkier by pre-embossing it with a fine overall pattern and is then calendered to soften its outside surfaces. This calendering can be combined with some additional embossing. The resulting calendered web is then again embossed in one or two steps to meet bulk requirements. The pre-embossing step can be carried out by individually pre-embossing the plies which are later joined to form the pre-embossed multi-ply web, or by first joining the plies and then embossing the resulting multi-ply web, or by individually and separately pre-embossing one or more single plies and one or more pre-plied webs and combining the resulting material into a pre-embossed multi-ply web. As an alternative, plies which are not pre-embossed can join at a nip which gives a calendering effect or both a pre-embossing and a calendering effect, and the resulting calendered multi-ply web then is embossed again for bulk effect.

In a first example in accordance with the invention, two plies are individually pre-embossed, typically with a fine overall pattern, and then are subjected to a three-nip treatment. In particular, the two pre-embossed plies join at a first nip which is between a rubber roll and a rubber or a steel roll. If the first nip is between two rubber rolls, the pre-embossed multi-ply web is subjected primarily or only to a calendering action which promotes the perception of smoothness (and hence softness) in the final product by smoothing somewhat the pre-emboss protuberances at the outside of the pre-embossed multi-ply web. If the first nip is formed between a rubber roll and a steel roll, the surface relief pattern of the steel roll and the pressure on the web at the nip can be chosen such that the effect is primarily calendering or is a selected combination of embossing and calendering. The resulting calendered web then passes through a second nip, which can be between a steel embossing roll and the rubber roll which also forms the first nip. At the second nip the web is subjected primarily to an embossing action, or can be subjected to a selected combination of embossing and calendering. The resulting web then passes through a third nip, which embosses it to add bulk. In a second example, the arrangement can be the same except that the two plies are not pre-embossed prior to the first nip, and the action at the first nip is either only calendering or both calendering and pre-embossing. In a third example, which can be used when a lesser degree of perceived softness is acceptable, the plies which can but need not be pre-embossed, are subjected to a two-nip treatment. The first nip is between two steel rollers and joins and embosses. The embossed two-ply web emerging from the first nip goes through the second nip, which is between one of the two steel rolls forming the first nip and a rubber roll. The primary function of the second nip is to smoothen the web somewhat so as to increase perceived softness. The third example is particularly suitable for using smaller rolls, for example 8" diameter rolls, so that in a production line the two-nip station can be combined with the winding station. More than two plies can be used for the multi-ply web. In addition, each of one or more of the plies coming into the first nip of the three- or two-nip treatment can be a single ply or a multi-ply web.

The term steel roll is used here to designate a relatively hard and rigid roll while the term rubber roll is used to designate a relatively soft and resilient roll; however, in fact other materials can be used for the "steel" roll, such as other hard metals, and materials other than rubber can be used for the "rubber" roll. The term web is used to designate a web of paper as well as of any other fibrous material or of any other material which can be subjected to the disclosed treatment to produce the final soft and bulky product. The term ply is used to mean a layer of a web which is multi-ply in the sense that it comprises or is formed by joining a number of layers of similar or dissimilar materials.

DETAILED DESCRIPTION

Figure 1:
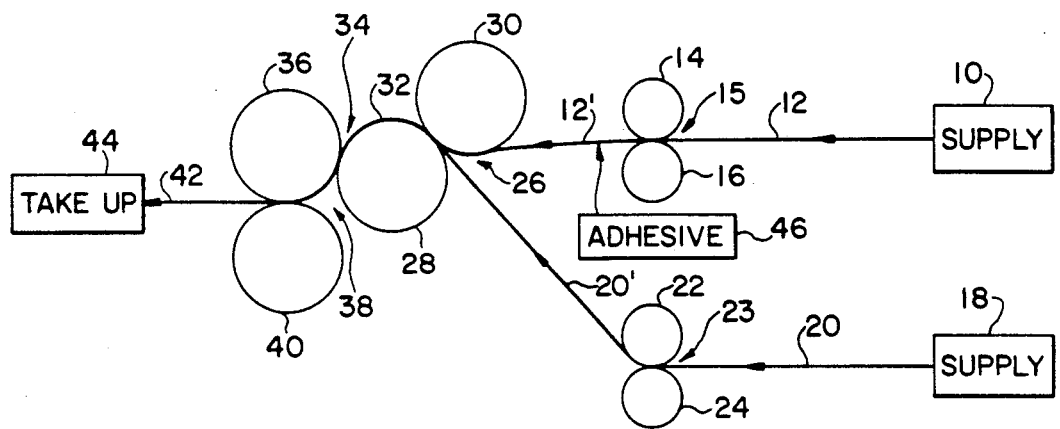
FIG. 1 illustrates a first exemplary embodiment, in which two plies are pre-embossed and are subjected to a three-nip treatment to form a two-ply web which is calendered and embossed and is characterized by high perceived softness.

Referring to FIG. 1 a supply 10 supplies a ply of web material 12 to the nip 15 between pre-embossing rolls 14 and 16 and, similarly, a supply 18 supplies a ply of web material 20 to the nip 23 between pre-embossing rolls 22 and 24. The pre-embossed web material 12' and 20' which has passed through the pre-emboss nips 15 and 23 joins at a first nip 26 which is between rolls 28 and 30, where they are joined into a multi-ply web 32. Typically, roll 28 is a resilient ("rubber") roll and roll 30 can be either a resilient or a hard ("steel") roll. If both are rubber rolls, nip 26 in addition to joining plies 12' and 20' into web 32, calenders web 32 and increases its perceived softness. If roll 32 is a steel roll with an embossing pattern, nip 26 adds embossing to web 32. Then the balance between embossing and calendering at nip 26 is determined by the selection of factors such as the surface texture of roll 30, the degree of resiliency of roll 28 and the pressure between rolls 28 and 30. Thus, web 32 can be only or primarily embossed at nip 26, or it can be both embossed and calendered. Multi-ply web 32 then passes through a second nip 34, which is between the first resilient roll 28 and an embossing roll 36, and then through a third nip 38, which is between the embossing roll 36 and a second resilient roll 40, and emerges therefrom as product web 42 which is supplied to a take-up roll 44. If desired to facilitate bonding of plies 12 and 20 at nip 26, an adhesive can be applied to one of the plies or to both plies from an adhesive applying device 46 in a manner known in the art.

Rolls 14, 16, 22, and 24 are selected such that a relatively fine pre-emboss pattern is formed on web materials 12 and 20. For example, all four pre-emboss rolls can be steel rolls or rolls of some other relatively hard material, or one roll in each pair of pre-emboss rolls can be made of a hard material such as steel while the other is made of a resilient material such as rubber.

The pre-embossing at nips 15 and 23 forms protuberances at least at one of the surfaces of plies 12 and 20. It has been discovered in accordance with the invention that if calendering is applied to these protuberances which are at the sides of plies 12' and 20' which form the outside surfaces of the final product 42, the final product tends to be perceived as softer than without such a calendering effect, and that such a calendering effect can be applied without detracting from the ability of later embossing which may be used to reach the desired bulk requirements of the final product. If both rolls 28 and 30 are resilient rolls, such as rubber rolls, the effect at nip 26 (provided in addition to joining the plies into a multi-ply web) is only or primarily of calendering. However, if as an alternative roll 28 is resilient but roll 30 is hard and has a selected embossing pattern, a selected combination of embossing and calendering can take place at nip 26. Nip 34 can be used only or primarily to add bulk through conventional embossing, but can also be used to provide some additional calendering effect, with the balance between any calendering and the embossing which is provided at nip 34 being dependent on factors such as those discussed above for nip 26. Finally, nip 38 is used only or primarily for embossing which adds bulk although some calendering may be provided at nip 38 as well. Typically, the pre-embossed pattern is significantly finer than any embossing pattern which may be applied at nip 26 and the embossing pattern applied at nips 34 and 38.

Figure 2:
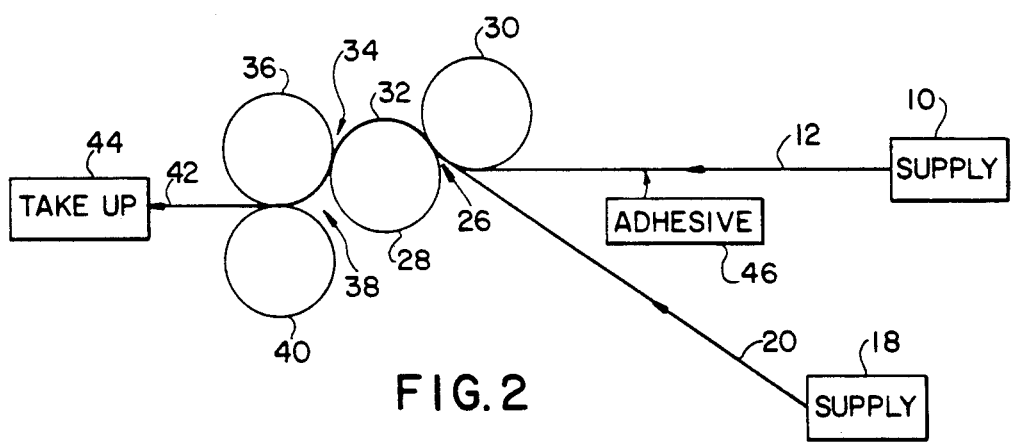
FIG. 2 illustrates a second exemplary embodiment, in which two plies that are not previously embossed are subjected to a three-nip treatment to form a two-ply web which is calendered and embossed and also is characterized by high perceived softness.

FIG. 2 illustrates an embodiment which is in many ways similar to that discussed in connection with FIG. 1 and, accordingly, like elements bear like reference numerals. The significant difference between the embodiments of FIG. 1 and FIG. 2 is that in FIG. 2 there are no pre-embossing rolls 14, 16, 22 and 24. In FIG. 2 plies 12 and 20 are not pre-embossed before they reach nip 26 between rolls 28 and 30. Nip 26 in FIG. 2 serves to join plies 12 and 20 into a multi-ply web 32' and at the same time serves to calender the multi-ply web 32' and, if desired, to add pre-embossing concurrently with the calendering. If both rolls 28 and 30 in FIG. 2 are resilient rolls, for example rubber rolls, then the effect at nip 26 (in addition to joining web materials 12 and 20) is only or primarily a calendering effect. If roll 30 is a rigid roll, for example a steel roll, then some pre-embossing effect can be added, depending on factors such as the embossing pattern of roll 30, the pressure on the web at nip 26 and the speed of the web at nip 26. Nips 34 and 38 can serve the same purposes as the similarly numbered nips in FIG. 1, and product web 42' can be similar, but not necessarily identical, to product web 42.

Figure 3:
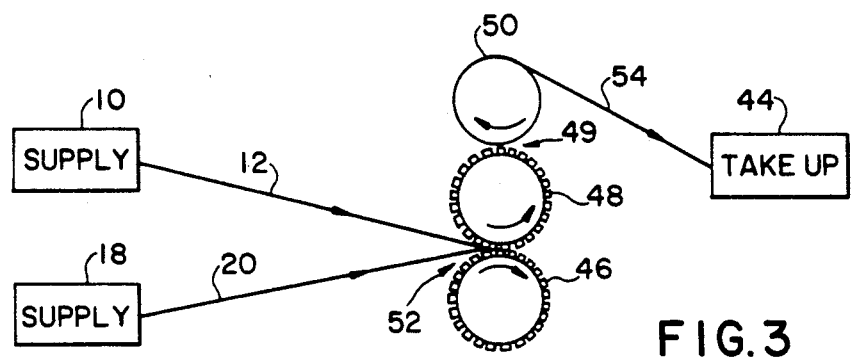
FIG. 3 illustrates a third example, using a two-nip treatment to form a product which may have lower perceived softness.

FIG. 3 illustrates a two-nip treatment that can be applied to plies that may have been pre-embossed in the manner discussed in connection with FIG. 1 or to plies which have not been pre-embossed. In the example of FIG. 3, supplies 10 and 18, which can be supply rolls, provide plies 12 and 20, respectively, to a first nip 52 formed between embossing rolls 46 and 48. In this example each of rolls 46 and 48 is made of a hard material such as steel, and the two rolls have embossing patterns which mesh to join plies 12 and 20 into a two-ply web and at the same time to impart high bulk to that web. The web goes around roll 48 and into a second nip 49 formed between rolls 48 and 50, where roll 50 is made of a resilient material such as rubber. Nip 49 adds a calendering effect to thereby increase the perceived softness of the two-ply product web 54 which is taken up at take-up 44. Typically, the two-nip treatment illustrated at FIG. 3 is less capable of achieving high perceived softness than the three-nip treatment illustrated in FIGS. 1 and 2. However, the degree of softness in each example depends to some extent on the selection of parameters such as the hardness of rolls, the embossing pattern and the nip pressure, so that it is possible in each case to achieve a selected degree of perceived softness within can be arranged to take less space than the three-nip equipment, particularly if smaller rolls are used (e.g., using -8"-diameter rolls at 46, 48 and 50), and indeed such equipment can be at the winding station of a production line rather than at a separate embossing station.

In practicing the invention, web material 12 or 20 can be, for example, a 1-ply tissue substrate of basis weight 11.0 to 18.0 lb/R, or a 2-ply tissue substrate of basis weight 8.0 to 11.0 lb/R, or a 1-ply towel substrate of basis weight 9.0 to 17.0 lb/R, or a 2-ply towel substrate of basis weight 15.0 to 34.0 lb/R. The pre-embossing pattern can be a fine shallow overall design (such as a linen design of 0.002" to 0.010" in depth) or a deeper design that would be removed partly or substantially with the embossing at one or more of nips 38, 34 and 26. The pressures at the nips are selected to accomplish the stated goals. As a nonlimiting example, if nip 26 is formed by two rubber rolls, it could substantially remove the pre-embossing due to nips 15 and 23, i.e., nip 26 could remove the pre-embossing to the extent that no pre-embossing could be perceived by the consumer. In such a case, only the final embossing, due to one or more of nips 38 and 34 would be seen by the consumer. The embossing and rubber rolls can be, for example, 20"-diameter rolls, but in the example of FIG. 3 smaller rolls can be used to advantage.

Perception tests by a panel employed at a facility of the assignee of this invention have shown that there is a statistically significant difference in perceived softness as between a product web with pre-embossing in accordance with the invention and the same product but without pre-embossing. In a particular example, a product web made by using the combination of pre-embossing and embossing in accordance with the invention was perceived in a statistically meaningful way as significantly softer that a product made without pre-embossing, all other factors being not significantly different.

I claim:

1. A method comprising:
   separately pre-embossing each of at least two webs to form respective pre-embossed webs;
   thereafter joining the pre-embossed webs to form a pre-embossed multi-ply web and calendering the pre-embossed multi-ply web to form a calendered multi-ply web; and
   thereafter embossing the calendered multi-ply web to form an embossed multi-ply web.

2. A method as in claim 13 in which the pre-embossing produces an embossing pattern which is significantly finer than that produced by said embossing.

3. A method comprising:
   providing a pre-embossed multi-ply web which is calendered at a first nip which is between a first resilient roll and a second roll to form a calendered multi-ply web;
   passing the calendered multi-ply web through a second nip which is between the first resilient roll and an embossing roll and then through a third nip which is between said embossing roll and a second resilient roll.

4. A method as in claim 15 in which the step of providing a pre-embossed multi-ply web comprises separately providing at least two pre-embossed webs and joining the separately provided webs into a single pre-embossed multi-ply web.

5. A method as in claim 16 in which said second roll is resilient.

6. A method as in claim 16 in which said second roll is rigid.

7. A method of converting a paper product to produce a converted product in the form of a tissue or towel product having both high bulk and softness comprising:
   separately pre-embossing each of at least two webs to reduce web strength and increase bulk;
   joining the pre-embossed webs to form a pre-embossed multi-ply web and calendering the pre-embossed multi-ply web to reduce protuberances formed in the pre-embossing step at the outside surfaces of the pre-embossed multi-ply web; and
   embossing the calendered multi-ply web to further increase bulk and decrease strength.

* * * * *